Nov. 14, 1950    J. V. HOLDAM, JR., ET AL    2,530,060
RADIO OBJECT LOCATION INDICATOR
Filed Nov. 27, 1944    3 Sheets-Sheet 1
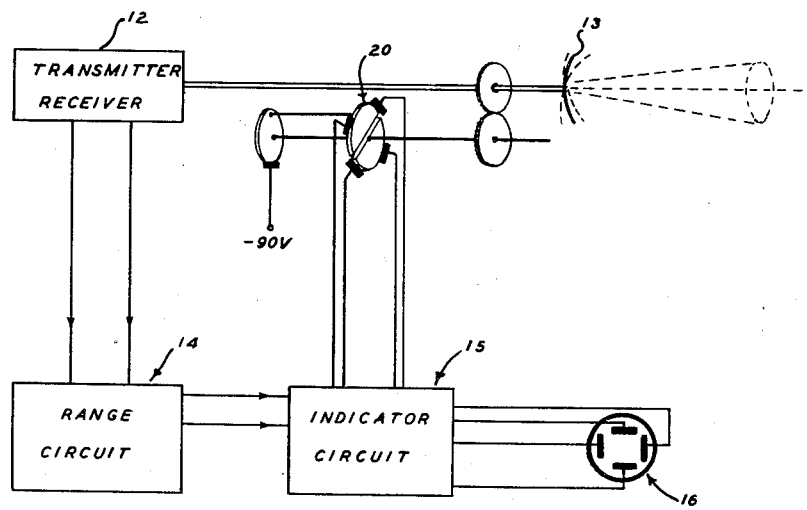
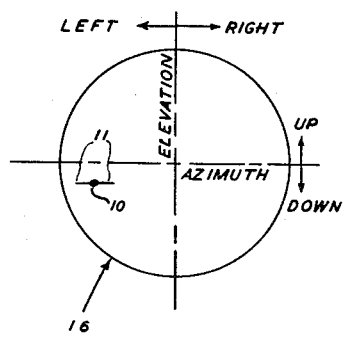
INVENTORS
JAMES VANCE HOLDAM JR.
LLOYD M. JONES
BY
William D. Hall
Attorney

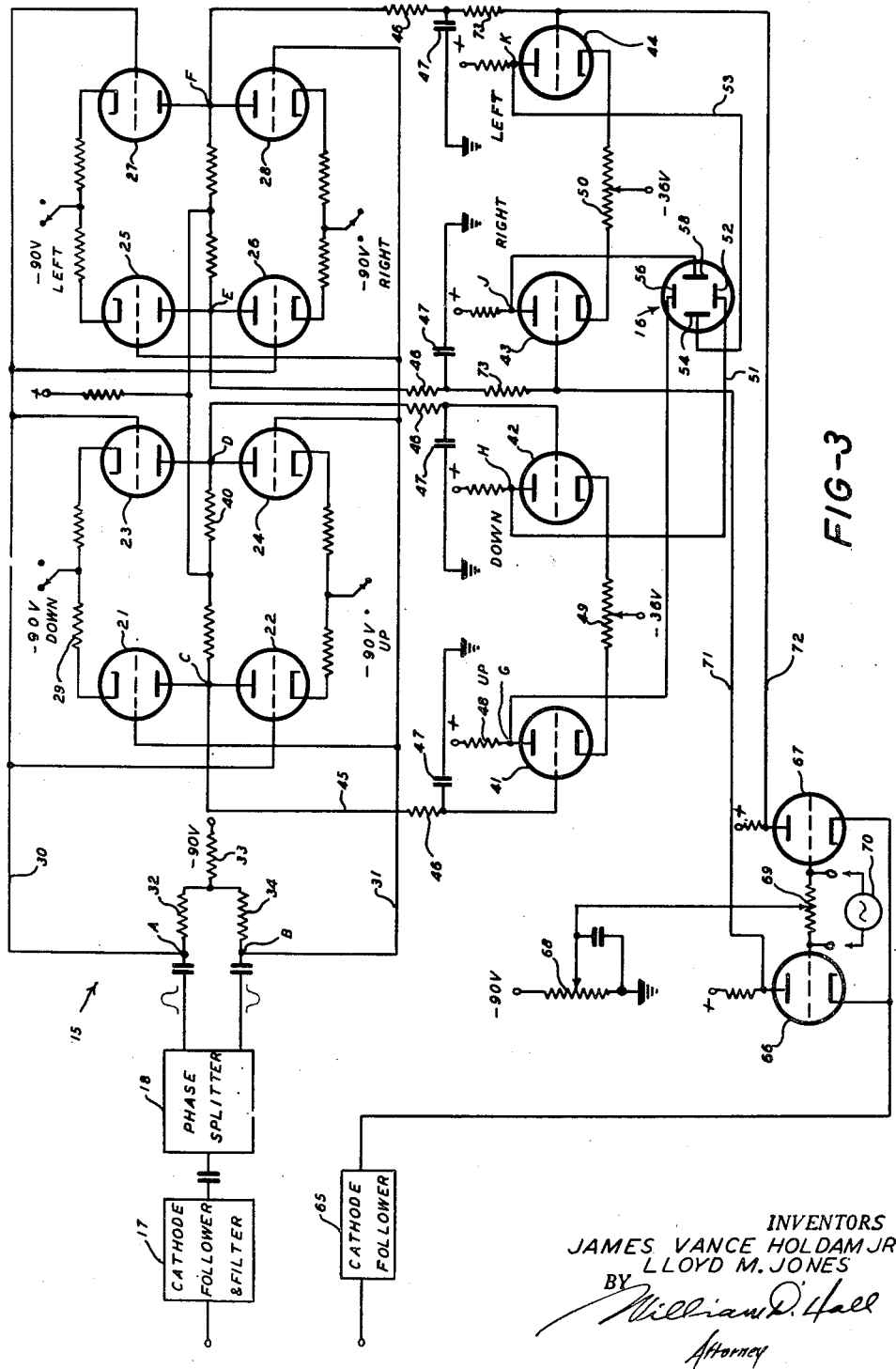

Nov. 14, 1950  J. V. HOLDAM, JR., ET AL  2,530,060
RADIO OBJECT LOCATION INDICATOR

Filed Nov. 27, 1944  3 Sheets-Sheet 3

INVENTORS
JAMES VANCE HOLDAM JR.
LLOYD M. JONES
BY
William D. Hall
Attorney

Patented Nov. 14, 1950

2,530,060

UNITED STATES PATENT OFFICE 2,530,060

RADIO OBJECT LOCATION INDICATOR

James Vance Holdam, Jr., and Lloyd M. Jones, Cambridge, Mass., assignors, by mesne assignments, to the United States of America as represented by the Secretary of War Application November 27, 1944, Serial No. 565,364

4 Claims. (Cl. 343—11)

This invention relates to airborne radio object-location equipment and particularly to electronic indicating apparatus for providing a gunner or other operator with a visual indication of the relative position in space of nearby objects such as enemy aircraft.

A primary object of this invention is to afford a visual indication of the range, azimuth and elevation of a nearby target such as an airplane. The apparatus functions to produce a spot on a cathode ray tube screen in a position which indicates the relative azimuth and elevation of the target in space. Range is indicated by "wings" or extensions of the spot on the screen, the width of the "wings" being inversely proportional to range.

It is a further object of the invention to achieve simplicity in the design of indicators for performing the above functions. This is done in the present instance by minimizing the number of moving parts, eliminating the use of sine wave reference voltages and by the incorporation of other novel features and advantages as will appear in the following disclosure.

In the drawings:

Fig. 1 is a diagrammatic illustration of a system embodying the present invention;

Fig. 2 is an elevational view of the cathode ray tube screen;

Fig. 3 is a schematic circuit diagram of the indicator circuit;

Figure 4:
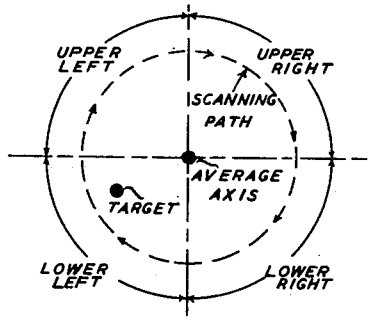
Fig. 4 is a diagrammatic representation of the target in space.

As used herein, the term "azimuth" should be taken in its broad sense to indicate relative azimuth or bearing with reference to a given direction or axis. Similarly, "elevation" will be understood to mean angle of elevation from a given point such as the source of a radiation beam. "Range" is used in its ordinary sense as meaning the distance from the given point to the object under consideration.

The present invention is particularly adapted to be used in conjunction with a conically scanning antenna which is mounted in a gun turret or the like in such a manner that the average axis of the radiation beam coincides in direction with the axis of the guns or other instrumentality. When the guns are pointed directly at the target, the cathode ray beam trace is centered on the screen of the cathode ray tube. However, if the target is displaced from the axis of the guns, that is, from the average axis of the beam, the spot or trace is then offset from the center of the screen, as indicated at 10 in Fig. 2, in a position corresponding to the displacement of the target relative to the observer insofar as the coordinates of azimuth and elevation are concerned. The range coordinate is indicated by the width of the wings 11, Fig. 2, which dimension is inversely proportional to the range. The cathode ray tube screen may be calibrated so that when the spot is on the center of the screen and the wings reach a sufficient breadth to fill the space between two vertical markers, the gunner knows that the position is correct for firing.

Referring to Fig. 1, the radiation beam is generated and the target signals are received by suitable means such as a transmitter-receiver 12. The conical scan of the radiated beam is produced, in the present instance, by rotation of a reflector 13 which is maintained at a predetermined angle with resject to the spin axis. The video signal from the transmitter-receiver 12 is supplied to the indicator circuit 15. A suitable range circuit, generally designated 14, is employed in conjunction with the transmitter-receiver 12 to gate the video signal and to supply the indicator circuit 15 with a voltage which is proportional to the range of the received signal. Inasmuch as our invention is primarily concerned with the indicator circuit, the particular type of range circuit which may be utilized is not described in detail herein.

As the radiation beam performs the conical scan, reflected signals are received from the target in a manner which is influenced by the position of the target relative to the average axis of the beam. If the target is located on the axis, the incoming signals are unmodulated. However, if the target is not centered on the axis, the signals are modulated at the conical scan frequency. This information is utilized to afford a visual indication of target position on the screen of a cathode ray tube 16, Fig. 2.

For the purpose of describing the present invention, it will be assumed that the target, in the present case, is located in the lower left quadrant, Fig. 4, as viewed from the position of the observer. The various quadrants are defined by horizontal and vertical planes representing zero elevation and zero azimuth, respectively, and passing through the source of the scanning beam. As viewed in cross-section, Fig. 4, the ray of maximum intensity in the scanning beam describes a circular path as the beam traverses the four quadrants defined by the horizontal and vertical reference lines. There will be some reflected signals from all objects situated in the space encompassed by the scanning path, within the effective range of the system. Under the assumed conditions, the video signal applied to the indicator circuit 15 is strongest when the beam is in the lower left quadrant, weakest when the beam is in the upper right quadrant, and of intermediate strength in the other two quadrants. The modulation envelope of the received echo signals is substantially sinusoidal, the maximum amplitude of this envelope occurring when the scanning beam is nearest the target, and the minimum amplitude occurring when the beam is diametrically opposite the position just described.

The high frequency oscillations of the echo signals are detected by the transmitter-receiver 12, and the resulting video signal enters the indicator circuit 15, Figs. 1 and 3. After passing through a cathode follower 17, the video signal is filtered to remove the pulse modulation, and the signal which remains is the modulation envelope resulting from the off-center position of the target. A phase splitter 18 produces two signals of the same form as this envelope, one being 180° out of phase with the other. The alternating voltage at point A, Fig. 3, is in phase with the input signal, while at point B the voltage is in phase opposition to this signal.

A commutator 20 shown schematically in Fig. 1 turning in synchronism with the rotating antenna reflector 13 is employed to automatically condition the indicator circuit 15 for receiving signals from each of the four quadrants.

Referring to Fig. 3, there are eight tubes, 21 to 28 inclusive, which are included in the indicator circuit 15. A suitable switching means associated with the commutator 20, Fig. 1, serves to connect the cathodes of these tubes periodically and in predetermined sequence through resistors as 29, Fig. 3, to a source of voltage negative with respect to ground (in this instance, −90 volts) in synchronism with the scanning of the various quadrants by the antenna. The grids of tubes 22, 23, 26 and 27 are connected by a wire 30 to the point A referred to hereinabove. A wire 31 connects the grids of tubes 21, 24, 25 and 28 to the point B. The point A is also connected by resistors 32 and 33 to a source of negative potential (−90 volts), while the point B is connected by the resistors 34 and 33 to this same source.

In commencing the description of operation it will be assumed that the scanning beam is just entering the lower left quadrant, traveling in a clockwise direction, Fig. 4, and conditions in the circuit will be analyzed with reference to the time which elapses from this instant. The commutator 20 and conically scanning antenna 13 are synchronized so that the cathodes of tubes 21, 23, 25 and 27 are switched to −90 volts, as shown in Fig. 3, during the time that the beam is in the lower left quadrant. The cathodes of tubes 22, 24, 26 and 28 are disconnected from the source of voltage during this interval.

The target is represented in Fig. 4 as being located in the lower left quadrant, but closer in position to the upper left quadrant than to the lower right quadrant. The interval of time required by the beam to scan a quadrant will hereinafter be referred to as one quarter-cycle and the time required to scan all four quadrants will be referred to as one complete cycle. Thus, the beam is in the lower left quadrant during the first quarter-cycle, the upper left quadrant during the second quarter-cycle, etc.

Figure 5:
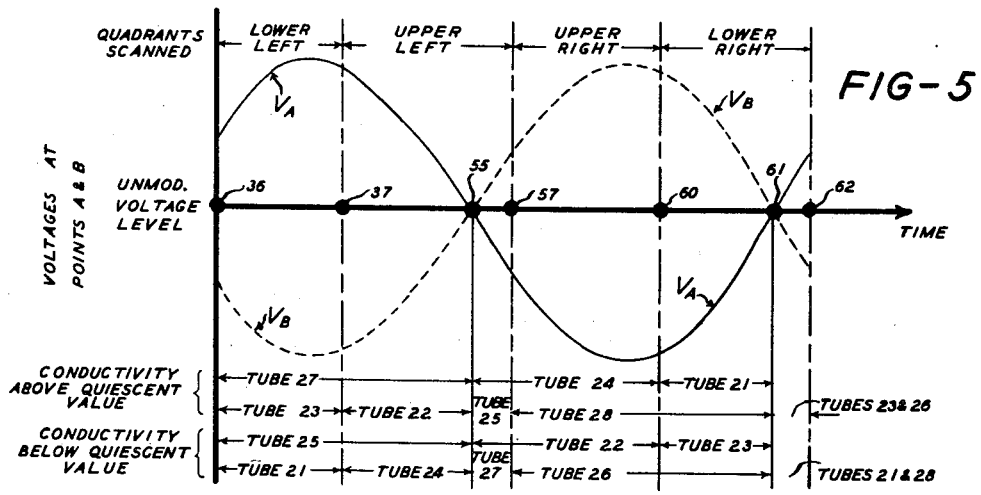
Figs. 5 and 6 are timing charts showing various operative relationships in the indicator circuit.

During the first quarter-cycle the modulation envelope of the detected signal is positive in sign; therefore, the potential at A, Fig. 3, is more positive than it would be if no modulated signals were being received. This is indicated by that portion of the curve of voltage $V_A$ versus time lying between the points 36 and 37, Fig. 5. During the first quarter-cycle the voltage $V_B$ at point B is more negative than the unmodulated voltage level. Inasmuch as the cathodes of tubes 23 and 27 are connected to −90 volts and there is a positive signal voltage on the grids of these tubes, the conduction of current in tubes 23 and 27 is increased above its quiescent value. In the case of tubes 21 and 25 the signal voltage impressed upon the grids of these tubes is negative in sign, as indicated by that portion of the curve of $V_B$ versus time between the points 36 and 37, Fig. 5; therefore, the conductivity of tubes 21 and 25 is less than the quiescent value. The tubes 22, 24, 26 and 28 are non-conductive during this interval inasmuch as their cathodes are disconnected from the voltage source.

The plates of tubes 23 and 24, Fig. 3, are connected through a common load resistance 40 to a positive voltage source. Similarly, tubes 21 and 22, 25 and 26, and 27 and 28 are connected in pairs in the manner named through common plate load resistors as 40 to the aforementioned positive voltage source. When the conduction in tube 23 increases as previously described, there is a decrease of potential at the point D where the plates of tubes 23 and 24 connect to the resistor 40. There is likewise a decrease of potential at the junction point F of the plates of tubes 27 and 28. At the points C and E in the plate circuits of the tube pairs 21—22 and 25—26, respectively, the potential increases above the value it would have if no modulated signal were being received.

The point C is electrically connected through a wire 45 and a resistor 46 to the grid of a tube 41. A condenser 47 shunts the grid of the tube 41 to ground. The resistor 46 and condenser 47 afford a type of filter, the purpose of which will be explained presently. The plate of tube 41 is connected through a load resistor 48 to a positive voltage source. The cathode of tube 41 is connected through a centering potentiometer 49 to a negative voltage source (−36 volts). Tubes 42, 43 and 44 arranged in circuits similar to that of tube 41 are respectively associated with the tube pairs 23—24, 25—26, and 27—28. The cathode of tube 42 is connected to a negative voltage source through the potentiometer 49. Another centering potentiometer 50 connects the cathodes of tubes 43 and 44 to the negative source.

When the potential of point D, Fig. 3, decreases, the grid of tube 42 becomes more negative and current flow through this tube is decreased. This causes the potential of point H at the plate of tube 42 to rise. Point H is connected by a conductor 51 to the lower vertical deflecting plate 52 of the cathode ray tube 16. The increase of potential at point H makes the plate 52 more positive and therefore tends to deflect the cathode ray beam downwardly. (It will be understood that a cathode ray tube having magnetic coil deflectors instead of deflecting plates could be adapted for use with this invention and hence the term "deflecting plate" or "deflector" should be broadly construed.) Increase of potential at point C causes the potential of point G to decrease, that is, become more negative. Point G is electrically connected to the upper vertical deflecting plate 56 of the cathode ray tube 16. The potential of plate 56 changes negatively in substantially the same amount as the potential of plate 52 changes positively. This produces a push-pull beam deflecting action which insures a constant average potential of the plates 52 and 56.

In a similar manner the decrease of potential at point F, Fig. 3, produces an increase in potential at point K at the plate of tube 44. The point K is connected by a wire 53 to the lefthand horizontal deflecting plate 54 of the cathode ray tube 16. Thus, this plate becomes more positive and tends to deflect the cathode ray beam to the left as viewed in Figs. 2 and 3. Increase of potential at point E causes the potential at point J to decrease, and hence the potential of the righthand deflecting plate 58 to which this point is electrically connected becomes more negative. The result is a push-pull action which assists in deflecting the beam to the left. Interaction of the various deflecting forces described above results in a downward and leftward deflecting force upon the cathode ray beam.

The condensers 47, Fig. 3, which have been referred to hereinabove, are for the purpose of producing a steady deflection of the spot 10 on the oscilloscope screen, Fig. 2, corresponding to target position so that the spot will not fluctuate as the antenna rotates. These condensers are of large capacity and are adapted to retain suitable charges in accordance with the amounts of deflecting voltage which should be impressed upon the various deflecting plates or coils of the oscilloscope 16. The manner in which the various deflecting voltages are impressed so as to produce the desired positioning of the spot will be apparent as the description of the invention progresses.

When the scanning beam enters the upper left quadrant, Fig. 4, the commutator 20, Fig. 1, switches the cathodes of the tubes 22 and 24 to −90 volts and disconnects the cathodes of the tubes 21 and 23. During this quarter-cycle the cathodes of the tubes 26 and 28 remain disconnected, while the cathodes of tubes 25 and 27 are connected to −90 volts. The modulation voltage V$_A$ at point A, Fig. 3, completes the positive part of its swing in the time interval between the points 37 and 55, Fig. 5, while the voltage V$_B$ completes the negative part of its swing in this same interval, which is less than a quarter-cycle. Tubes 22 and 27 conduct current in excess of the quiescent value while the conductivity of tubes 24 and 25 is less than under quiescent conditions. At point 55, Fig. 5, in the second quarter-cycle, the modulation voltage V$_B$ at point B, Fig. 3, enters the positive portion of its swing, while the voltage V$_A$ commences on its negative swing. Throughout the remainder of this quarter cycle, from point 55 to point 57, Fig. 5, the conductivity of tubes 22 and 27 decreases below the quiescent value and the tubes 24 and 25 are rendered more conductive than under quiescent conditions.

In the third quarter-cycle the radiation beam scans the upper right quadrant, Fig. 4. Between the points 57 and 60, Fig. 5, the tubes 24 and 28 are rendered more conductive and the tubes 22 and 26 less conductive than under quiescent conditions. Tubes 21, 23, 25 and 27 are non-conductive.

In the fourth quarter-cycle the radiation beam scans the lower right quadrant, Fig. 4. In this quarter-cycle the tubes 22, 24, 25 and 27 are non-conductive. Between the points 60 and 61, Fig. 5, the tubes 21 and 26 are more conductive and the tubes 23 and 28 less conductive than the quiescent value. From point 61 to point 62 in this quarter-cycle the tubes 23 and 26 are more conductive while the tubes 21 and 28 are less conductive than the quiescent value.

Figure 6:
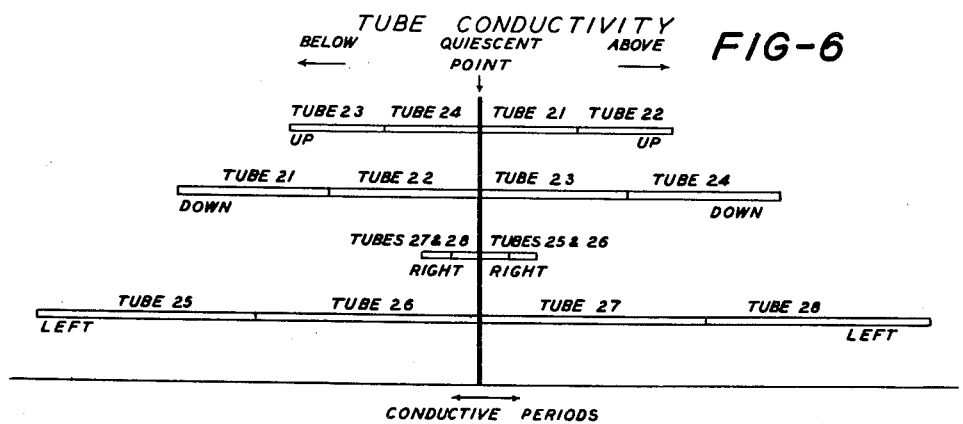

The magnitudes of the various charge voltages which are built up on the condensers 47, Fig. 3, are measured by the respective time intervals during which the conductivities of the active tubes 21, 22, 23, 24, 25, 26, 27 and 28 are above or below the quiescent value throughout the scanning cycle. It will be noted that there is always one active tube in each pair. Referring to Fig. 6, which affords a comparison between the conductive periods of the various tubes under the assumed conditions, it can readily be seen that the tubes 21, 22, 23 and 24 conduct in such a manner as to cause downward deflection of the cathode ray beam for a total time interval which is longer than the period in which they tend to produce upward deflection. Likewise, the tubes 25, 26, 27 and 28 conduct in a manner such that the predominant effect is to cause deflection of the beam to the left, with only a slight tendency toward deflection in the right-hand direction. Furthermore, the net deflecting force to the left is, in the present instance, stronger than the net downward deflecting force so that the cathode ray tube spot 10 occupies a position in the lower left quadrant on the viewing screen but closer to the horizontal axis than to the vertical axis, which position corresponds to the relative location of the target in space, Fig. 4.

By assuming various other positions of the target relative to the scanning apparatus, and following an analysis similar to that above, it can be shown that the cathode ray tube spot 10, Fig. 2, is always positioned in a manner corresponding to the target location. If the target is on the dividing line between two adjacent quadrants, there is an even balance of the deflecting voltages along the axis perpendicular to this dividing line. If the target is centered on the average axis of the beam there is a balancing of the deflecting voltages in all four directions, causing the spot 10 to be centered on the screen of the oscilloscope 16, Fig. 2.

Positioning of the spot 10 on the cathode ray tube screen, as just described, gives an indication of the elevation and azimuth of the target. For the purpose of indicating the range of the target, wings 11 are added to the spot 10. A circuit for accomplishing this function is shown in Fig. 3. A voltage proportional to the range of the target enters the indicator circuit through a cathode follower 65 and is applied to the cathodes of tubes 66 and 67. A potentiometer 68 supplies an adjustable negative bias through a centering potentiometer 69 to the grids of the tubes 66 and 67. An alternating voltage from a suitable source 70 is impressed on the terminals of the potentiometer 69 which are respectively connected to the grids of the tubes 66 and 67. Suitable plate voltages are supplied to tubes 66 and 67, and the plates of these tubes are respectively connected by conductors 71 and 72 to the grids of tubes 43 and 44. Isolating resistors 73 are interposed between the grids of the tubes 43 and 44 and the filters comprising resistors 46 and condensers 47 respectively associated with these grid circuits. Signals from the plates of the tubes 66 and 67 are thus applied alternatively to the grids of tubes 43 and 44 so as to produce deflections of the cathode ray spot 10 alternatively to the left and right as viewed in Fig. 2, thereby producing the horizontal wings 11. The setting of the potentiometer 68 determines the width of the wings 11 for a given range. Potentiometer 69 is adjusted to produce wings of equal width. As the distance from the scanning apparatus to the target increases, the signal supplied by the cathode follower 65 becomes stronger and the wings 11 increase in width. Conversely, if the target recedes the signal is weaker and the wings grow smaller.

From the foregoing specification it will be appreciated that this invention affords a rapid and dependable presentation of data regarding the location of objects such as an enemy aircraft. The visual indication on the cathode ray tube 16 combines the three coordinates of elevation, azimuth and range, enabling the operator readily to determine the relative position of the target in space. It will be noted that the modulation envelope of the incoming signal is utilized to position the indicator spot without resort being had to any special reference voltage or the like for phase comparison purposes. The apparatus is of simple and compact construction especially suited to installation in aircraft.

It should also be noted that the indicator circuit of Fig. 3 could operate without the phase splitter 18 and with only one-half the number of tubes 21 to 28 which are used in the illustrated embodiment. However, it has been found that more satisfactory operation is insured by utilizing the additional tubes and the reversed-phase signal produced at B.

Thus, while we have illustrated and described a selected embodiment of our invention, it will be understood that variations and modifications may be made without departing from the spirit of the invention, and therefore we do not desire to be limited to the precise details disclosed herein but wish to avail ourselves of all improvements and modifications within the purview of the following claims.

We claim:

1. In a radio object-locating apparatus having a conically scanning antenna and means for receiving modulated signal pulses reflected from a target in space, a cathode ray tube having a plurality of deflectors adapted to have deflecting voltages applied thereto for positioning a cathode ray beam with reference to at least two space coordinates, a plurality of electronic devices each in a normally inoperative state, automatic switching means for conditioning said electronic devices to operate in a predetermined sequence in timed relation with the scanning movement of said antenna, means responsive to the modulation envelope of a detected signal for selectively effecting operation of the conditioned electronic devices depending upon the time variation of such signal envelope in reation to the operational timing of said switching means, and means controlled by said electronic devices for applying voltages of variable value to the deflectors of said cathode ray tube thereby to position the cathode ray beam in accordance with the location of the target in space.

2. In a radio object-locating apparatus having means for conically scanning a given space with a pulsed radiation beam and which is adapted to receive pulses amplitude-modulated at the scan frequency that are reflected from a target positioned eccentrically with respect to the average axis of the beam, the combination of: a cathode ray tube having four deflectors capable of being potentialized for deflecting a cathode ray beam in various directions corresponding to the coordinate axes of upper elevation, lower elevation, left azimuth and right azimuth, respectively, to which the position of the target is referred; control means for said cathode ray tube including at least four electron tubes respectively allocated to said coordinate axes and each being operative when rendered conductive to effect potentialization of a respective one of said deflectors; automatic switching means operating in synchronism with said scanning means to condition said tubes for conduction in predetermined sequence, said tubes being conditioned by groups in correlation with the coordinate axes defining the space quadrants which are scanned by said radiation beam; means for impressing upon the control elements of said tubes a modulation-envelope voltage derived from the received signal pulses whereby the conditioned tubes are enabled to conduct according to the strength of the modulated signal; and means operatively interposed between said tubes and said deflectors for causing steady voltages to be impressed upon said deflectors as determined by the relative magnitudes of the signals received from the several space quadrants thereby to produce on said cathode ray tube screen a spot image indicating by its location the elevation and azimuth of said target.

3. An apparatus as defined in claim 2, including means for superimposing on said left and right deflectors an alternating voltage inversely proportional to the range of said target thereby to produce on said cathode ray tube screen a spot image having horizontal wings to indicate the range of said target.

4. In a radio object-locating apparatus which has means for conically scanning a given space with a pulsed radiation beam and is adapted to receive pulses that are reflected from a target, an electronic indicator comprising a cathode ray tube including four deflectors capable of being energized for deflecting a cathode ray beam in various directions corresponding to the coordinate axes of elevation and azimuth respectively to which the position of the target is referred, control means for said cathode ray tube including at least eight electron tubes respectively allocated in pairs to said coordinate axes and each being operative when rendered conductive to effect energization of a respective one of said deflectors, automatic switching means operable in synchronism with said scanning means to condition said tubes in said pairs for conduction in predetermined sequence correlated with the coordinate axes defining the space quadrants which are scanned by said radiation beam, means for impressing upon the control elements of four of said tubes, one from each of said pairs, a modulation-envelope voltage derived from the received signal pulses, means for impressing on the control elements of the remaining four of said tubes a second modulation-envelope voltage 180° out-of-phase with respect to said first-mentioned modulation-envelope voltage whereby the conditioned tubes are enabled to conduct according to the strength of the modulated signal, and means operatively interposed between said tubes and said deflectors for causing steady voltages to be impressed upon said deflectors as determined by the relative magnitudes of the signals received from the several space quadrants thereby to produce on said cathode ray tube screen a spot image indicating by its location the elevation and azimuth of said target.

JAMES VANCE HOLDAM, Jr.
LLOYD M. JONES.

REFERENCES CITED

The following references are of record in the file of this patent:

UNITED STATES PATENTS

| Number | Name | Date |
|---|---|---|
| 2,082,347 | Leib et al. | June 1, 1937 |
| 2,231,929 | Lyman | Feb. 18, 1941 |
| 2,412,702 | Wolff | Dec. 17, 1946 |
| 2,415,566 | Rhea | Feb. 11, 1947 |
| 2,422,361 | Miller | June 17, 1947 |
| 2,427,905 | Fyler | Sept. 23, 1947 |
| 2,440,777 | Lyman | May 4, 1948 |
| 2,449,976 | Busignies | Sept. 28, 1948 |

FOREIGN PATENTS

| Number | Country | Date |
|---|---|---|
| 837,239 | France | Nov. 3, 1938 |
| 542,634 | Great Britain | Jan. 21, 1942 |
| 557,870 | Great Britain | Dec. 9, 1943 |